United States Patent
Souders et al.

(10) Patent No.: US 7,694,187 B2
(45) Date of Patent: *Apr. 6, 2010

(54) METHOD OF PERIPHERAL TYPE IDENTIFICATION IN A SYSTEM OF CIRCUMVENTION AND RECOVERY

(75) Inventors: Keith A. Souders, Tampa, FL (US); Jamal Haque, Tampa, FL (US); James E. Lafferty, St. Petersburg, FL (US); Edward R. Prado, Palm Harbor, FL (US)

(73) Assignee: Honeywell International Inc., Morristown, NJ (US)

( * ) Notice: Subject to any disclaimer, the term of this patent is extended or adjusted under 35 U.S.C. 154(b) by 587 days.

This patent is subject to a terminal disclaimer.

(21) Appl. No.: 11/672,065

(22) Filed: Feb. 7, 2007

(65) Prior Publication Data
US 2008/0189449 A1 Aug. 7, 2008

(51) Int. Cl.
*G06F 11/00* (2006.01)
(52) U.S. Cl. ............................. 714/44; 714/43
(58) Field of Classification Search ................ 714/44, 714/43, 56; 710/15, 1, 36
See application file for complete search history.

(56) References Cited
U.S. PATENT DOCUMENTS

| | | | |
|---|---|---|---|
| 4,413,327 A | 11/1983 | Sabo et al. | |
| 5,317,441 A | 5/1994 | Sidman | |
| 5,786,975 A | 7/1998 | Duncan et al. | |
| 6,141,770 A * | 10/2000 | Fuchs et al. | 714/11 |
| 6,330,627 B1 | 12/2001 | Toda | |
| 6,401,159 B1 | 6/2002 | Wang | |
| 6,424,177 B1 | 7/2002 | Hairapetian | |
| 7,260,742 B2 * | 8/2007 | Czajkowski | 714/21 |
| 7,343,579 B2 * | 3/2008 | Coxe et al. | 716/16 |
| 7,428,473 B2 * | 9/2008 | Rodriguez et al. | 702/185 |
| 2006/0020774 A1 * | 1/2006 | Ramos et al. | 712/226 |
| 2007/0022318 A1 | 1/2007 | Copenhaver et al. | |
| 2008/0256375 A1 * | 10/2008 | Haque et al. | 713/324 |

OTHER PUBLICATIONS

Ramos et al. "Environmentally Adaptive Fault Tolerant Computing (EAFTC)." IEEEAC paper #10787, Version 4, Updated Oct. 27, 2004.*

Ramos et al, "Environmentally Adaptive Fault Tolerant Computing (EAFTC)", Mar. 2005, Publisher: 2005 IEEE Aerospace Conference.

* cited by examiner

*Primary Examiner*—Dieu-Minh Le
(74) *Attorney, Agent, or Firm*—Fogg & Powers LLC

(57) ABSTRACT

A method of implementing a circumvention and recovery system comprising conveying peripheral identifiers to a controller, and determining a level of susceptibility of a peripheral to select events based on the peripheral identifier. The method further includes controlling each peripheral based on the level of susceptibility of the peripheral during detection of a select event.

13 Claims, 6 Drawing Sheets

US 7,694,187 B2

METHOD OF PERIPHERAL TYPE IDENTIFICATION IN A SYSTEM OF CIRCUMVENTION AND RECOVERY

This application is related to U.S. patent application Ser. No. 11/672,068 having a title of "A SYSTEM OF CIRCUMVENTION AND RECOVERY IN A MULTI-FUNCTION SYSTEM", U.S. patent application Ser. No. 11/672,056 having a title of "A METHOD FOR IMPLEMENTING A CONTROL CHANNEL IN A SYSTEM OF CIRCUMVENTION AND RECOVERY", and U.S. patent application Ser. No. 11/672,061 having a title of "EXPEDITING RECOVERY FROM A RADIATION EVENT BY ELEVATING HEALTH MONITORING DURING THE EVENT" all of which are filed on the same date herewith. The applications are hereby incorporated herein by reference.

BACKGROUND

Mission application systems that use commercial off the shelf components (COTS) are prone to failure when they experience hostile environments. For example, the performance of a typical COTS processor that is exposed to certain levels of radiation may suffer, due to latch-up that may result in total loss of processor activity. To accommodate for the effects of radiation, radiation hardened processors have been developed. The performance of these types of processors is not affected by the radiation of various levels. However, radiation hardened processors in comparison to COTS have their limitations, in terms of size, weight, power, instruction per second combined with high cost. With increasing processing demand, this limited Radiation hardened processing dictates the application that can be flown in space. The lack of processing performance of radiation hardened processors is especially crucial in mission application systems designed to travel in space where the speed of processing is an issue.

For the reasons stated above and for other reasons stated below which will become apparent to those skilled in the art upon reading and understanding the present specification, there is a need in the art for a system that effectively deals with hostile environments without sacrificing necessary performance to complete a mission.

SUMMARY

One embodiment is a method of implementing a circumvention and recovery system comprising conveying peripheral identifiers to a controller, and determining a level of susceptibility of a peripheral to select events based on the peripheral identifier. The method further includes controlling each peripheral based on the level of susceptibility of the peripheral during detection of a select event.

DRAWINGS

The present invention can be more easily understood and further advantages and uses thereof more readily apparent, when considered in view of the detailed description and the following figures in which.

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Embodiments of the present invention provide a multi-function system that includes a circumvention and recovery system. The circumvention and recovery system detects disruptive events and employs appropriate safeguards in peripheral equipment that is based on the peripheral's level of susceptibility to a detected event and returns the peripherals to normal operations after the event has finished or reached a level that no longer presents a threat. A peripheral type, which is based on the peripheral identifier, is used to indicate the level of susceptibility of the peripheral to a controller in the circumvention and recovery system. Circumvention includes but is not limited to any mitigation action performed to protect electronic circuits, processors, and components from being damaged due to external environments. Examples of actions include but are not limited to removing power from circuits and/or performing circuit resets such that circuits are protected during the event. In one embodiment, a controller employs an environmentally hardened processor. The system uses the hardened processor to perform critical and moderate control functions such as vehicle navigation and house keeping while performing system health checks during radiation events. One or more hardened processor may be used. Another embodiment uses a controller that employs two processors, an environmentally hardened processor and a COTS high speed processor. The system uses a radiation hardened processor as the controller during radiation events and the high speed COTS processor during normal operations.

Figure 1:
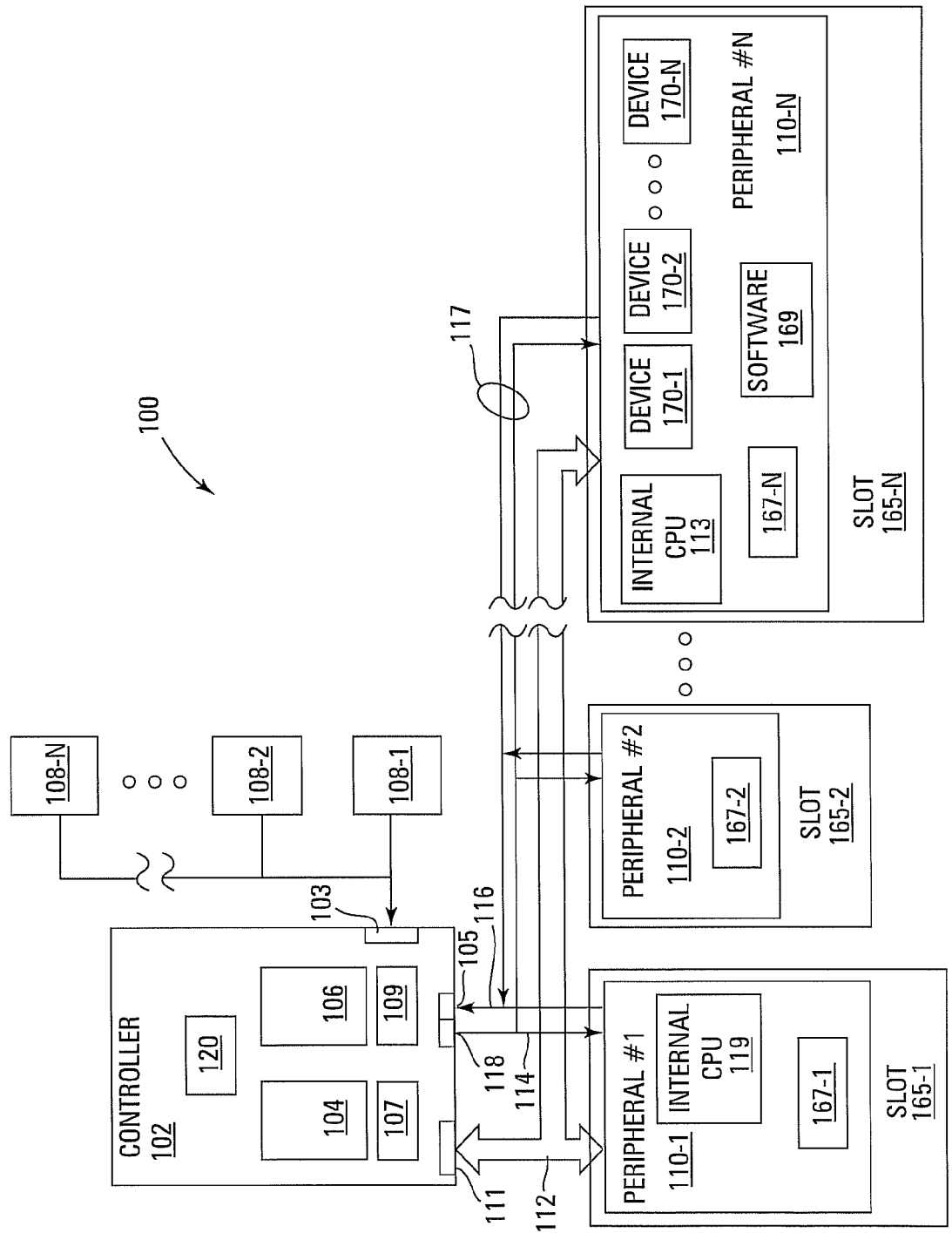
FIG. 1 is a block diagram of a multi-function system having a system of circumvention and recovery of one embodiment of the present invention.

Referring to FIG. 1, one embodiment of a multi-function system 100 including the circumvention and recovery system (also referred to herein as circumvention and recovery system 100) is illustrated. The multi-function system 100 includes a controller 102, event detectors 108 (1-N), peripherals 110 (1-N), a dedicated control interface 117 that communicatively couples the controller 102 to the plurality of peripherals 110 (1-N). The multi-function system 100 also includes a communication interface 112 that communicatively couples the controller 102 to each peripheral 110 that includes an internal central processing unit, such as peripheral 110-1 and 110-N. Peripherals 110-1 and 110-N include internal central processing units (CPU) 119 and 113, respectively. The communication interface 112 is also referred to herein as "channel 112" or "communication channel 112." In one implementation of this embodiment, the communication interface 112 includes the port 111.

In one implementation of this embodiment, the dedicated control interface 117 includes read peripheral control channel 114 and write peripheral control channel 116 that provide peripheral status control lines. The dedicated control interface 117 is also referred to herein as "channel 114" or "peripheral control write channel 114" and "channel 116" or "peripheral control read channel 116." In one implementation of this embodiment, the control interface 117 is shared so that read peripheral control channel 114 and write peripheral control channel 116 are one line. In another implementation of this embodiment, the control interface 117 is a single-ended interface. In yet another implementation of this embodiment, the control interface 117 is a differential interface.

As illustrated in FIG. 1, at least one peripheral 110 comprises a plurality of devices 170 (1-N). The devices 170 (1-N) are shown in peripheral 110-N but others of the peripherals 110 can also have a plurality of devices. The peripherals 110-N includes software module 169. In one implementation of this embodiment, the software module 169 assigns a fixed address and/or an index for the peripheral 110. In some embodiments, the fixed address or index is the peripheral identifier that is indicative of a peripheral type, i.e., event hardened, event tolerant, event intolerant, or combinations thereof.

In implementations of this embodiment, the peripherals are inserted in a system chassis containing slots for peripherals. As shown in FIG. 1, the peripherals 110 (1-N) are inserted into respective slots 165 (1-N). Devices 167(1-N) are installed and configured on respective ones of the peripherals 110 (1-N). Each device 167 provides a means of electrically conveying an assigned unique address and/or identity for the respective peripheral 110. In some embodiments, devices 167(1-N) are one, many or combinations of pull up and/or pull down resistors, switches, digital devices, analog devices, or programmable devices configured by a software module 169. The devices 167 (1-N) can be the same as or different from each of the other devices 167 (1-N).

Either the device 167-1 or the physical slot 165-1 into which the peripheral 110-1 is inserted is implemented to assign a fixed address and/or ail index to the peripheral 110. In one implementation of this embodiment, the fixed address or index can be a peripheral identifier that is indicative of the peripheral type.

As illustrated in FIG. 1, the controller 102 is in communication with the event detectors 108 (1-N). FIG. 1 illustrates a plurality of event detectors 108 (1-N). In embodiments, one or more event detectors 108 (1-N) are used to detect select events, also referred to herein as "select events," or "environmental events," such as radiation. Other types of event detectors are contemplated such as, but not limited to, water detectors, chemical detectors, radiation detectors, vibration detectors, thermal detectors and the like. In fact, any type of detector that detects an event that is detrimental to the performance of the controller 102, the peripherals 110 (1-N) or the channels 112, 114 and 116 can be used. Moreover, different types of event detectors 108 can be used in a single system. That is, event detector 108-1 may be a different type of event detector than 108-2. When an event detector 108 (1-N) detects a select event, an event-detected signal indicating the detection is communicated to the controller 102 through event signal port 103. Based on the received event signal, the controller 102, controls functions of the peripherals 110 (1-N) for optimal performance during the detected event. Once the event or events are over or determined to no longer be a threat, normal operating functions are restored by the controller 102. In one embodiment, an end of event is detected by one of the event detectors 108 (1-N) and communicated back to the controller 102. In another embodiment, an event timer 107 is used to determine the end of an event. This embodiment is used when the length of an event can be accurately predicted. Other embodiments, use other commonly know methods of determining the end of an event.

The controller 102 in the embodiment of FIG. 1 has a single dedicated clock 120 and two processors, a normal relatively high speed processor 104 that is susceptible to events that is used during normal operations and an environmentally hardened processor 106 designed to work even during an event. The controller 102 will change operation from the normal processor 104 to the hardened processor 106 based on the detected event. In one embodiment, the environmentally hardened processor 106 is a radiation hardened processor. In one embodiment, the controller 102 includes a memory 109 to store critical information used by the peripheral 110 when the peripheral 110 is shut down. In embodiments of the present invention, the controller 102 applies predefined or dynamic safeguards to the peripherals 110 (1-N) based on the peripheral's ability to withstand the detected event. Hence the susceptibility of each peripheral 110 is used to determine the safeguards that are implemented on the peripheral 110. Once the event is determined to no longer be a threat, the controller 102 returns each peripheral 110 back to full function.

The control interface 117 is configured to place the peripherals 110 in safe mode. As defined herein, safe mode comprises taking an action to prevent damage to the peripheral 110 during the select event and to prevent loss of data during the select event. For example, safe mode includes powering down all the peripherals 110(1-N), powering down a subset of the peripherals 110 (1-N), putting all the peripherals 110 (1-N) into standby mode, putting a subset of the peripherals 110 (1-N) into standby mode, powering down all the devices 170 (1-N) in at least one peripheral (such as 110-N), powering down a subset of the devices 170(1-N) in at least one peripheral 110, putting all the devices 170 in at least one peripheral 110 into standby mode, putting a subset of the devices 170 (1-N) in at least one peripheral 110 into standby mode, and combinations thereof. In one implementation of this embodiment, the normal processor 104 is treated as a peripheral 110 during a select event, so that the normal processor 104 is placed into safe mode during the select event.

In another implementation of this embodiment, the dedicated control interface 117 is only used to control signals sent to and from the peripherals 110. In yet another implementation of this embodiment, the dedicated control interface 117 is only used to control signals sent to and from the peripherals 110 during an environmental event.

The methods of this specification establish an organized manner by which to establish the level and effort of circumvention and recovery system 100 for each peripheral 110 of the multi-function system 100. In embodiments of the present invention the peripherals 110 (1-N) are a mixture of peripherals with commercial-off-the-shelf (COTS) components, peripherals that include all environmentally hardened components, and/or peripherals that include both COTS and environmentally hardened components. Hence, the ability of each peripheral 110 to handle a detected event will vary.

Specifically, the plurality of peripherals 110 (1-N) having different levels of susceptibility to select events include at least one of radiation hardened components; radiation tolerant components; components having undetermined tolerance to radiation; components having known tolerance to radiation; one or more radiation hardened memories; one or more radiation tolerant memories; one or more memories having undetermined tolerance to radiation; one or more memories having known tolerance to radiation; one or more radiation hardened power supplies; one or more radiation tolerant power supplies; one or more power supplies having undetermined tolerance to radiation; one or more power supplies having known tolerance to radiation; commercial components; commercial central-processing-units; select-event-hardened components; select-event-tolerant components; components having undetermined tolerance to select events; components having known tolerance to select events; one or more select-event-hardened memories; one or more select-event-tolerant memories; one or more memories having undetermined tolerance to select events; one or more memories having known tolerance to select events; one or more select-event-hardened power supplies; one or more select-event-tolerant power supplies; one or more power supplies having undetermined tolerance to select events; one or more power supplies having known tolerance to select events; commercial components; and commercial central-processing-units.

Examples of peripheral types and the associated peripheral identifiers and levels of susceptibility are shown in Table 1. A mixed level of susceptibility indicates that some components or devices 170 in the peripheral 110 have high level of susceptibility and other components or devices 170 in the peripheral 110 have low level of susceptibility. When a peripheral is of "mixed level of susceptibility," the components or devices in the peripheral that are susceptible to the select event are shut down during an event, while the components or devices in the peripheral that are tolerant to the select event continue to operate during the select event.

TABLE 1

| Peripheral identifier | Peripheral Type | Level of susceptibility |
| --- | --- | --- |
| 0 | Radiation hardened CPU and Memory - Type 0 | Low |
| 1 | Commercial CPU and Memory - Type 1 | High |
| 2 | Radiation hardened CPU and Commercial Memory - Type 2 | Mixed |
| 3 | Commercial CPU and radiation hardened Memory - Type 3 | Mixed |
| 4 | Commercial CPU and both Commercial and radiation hardened Memory - Type 4 | Mixed |
| 5 | Radiation hardened CPU and both Commercial and radiation hardened Memory - Type 5 | Mixed |

As stated above, the controller 102 applies predefined safeguards to the peripheral 110 based on there ability to handle the event detected. The controller 102 is in communication with the peripherals 110 via peripheral control read channel 116 and a peripheral control write channel 114 through respective control-read-channel port 105 and control-write-channel port 118. In one embodiment, enable/disable signals are communicated across the control write lines 114. Verification of the enable/disable signals are communicated across the control read lines 116. In one embodiment, the controller 102 controls the peripherals 110 individually. In another embodiment, the controller 102 controls similar peripherals 110 simultaneously.

Communication channel 112 is used to communicate between the controller 102 and peripherals 110 that have CPU's, such as peripherals 110-1 and 110-N via port 111. The communication channel 112 allows for the communication with and control of the respective CPU 119 and 113 by the controller 102. If the CPU 119 and/or 113 are to be shut down as the result of a detected event, vital data is stored in memory 109 of controller 102 during the shut down. When the event is over, the stored vital data is retrieved and sent back to the respective CPU 119 and 113.

In one embodiment of the present invention, peripherals with CPU's 119 and 113 that are performing vital functions during a detected event are allowed to continue while they are functioning properly. In this embodiment the controller 102 repeatedly monitors the respective CPU 119 and 113 to ensure it is functioning properly. If its performance is degraded by the select event, the peripheral 110 is shut down. Monitoring the health of a CPU during an event is further described in the commonly assigned application Ser. No. 11/672,061 herein filed on the same day and incorporated herein by reference.

In one implementation of this embodiment, the communication interface 112 includes a single dedicated clock 120 in the controller 102. In another implementation of this embodiment, the communication interface 112 includes a dedicated transmit clock in the controller and a dedicated receive clock in the controller both indicated by clock 120 in FIG. 1. In yet another implementation of this embodiment, the communication interface 112 a single bi-directional data line that is implemented in a shared-full-duplex-serial interface. The shared-full-duplex-serial interface is configured for one of a plurality of possible formats including a polled request-and-grant format implemented in a single-ended technology or differential technology, a time-multiplexed format implemented in a single-ended technology or differential technology, a statistical-multiplexed format implemented in a single-ended technology or a differential technology; and combinations thereof. The single-ended technology and differential technology are described in the commonly assigned application Ser. No. 11/672,056 herein filed on the same day and incorporated herein by reference.

Figure 2:
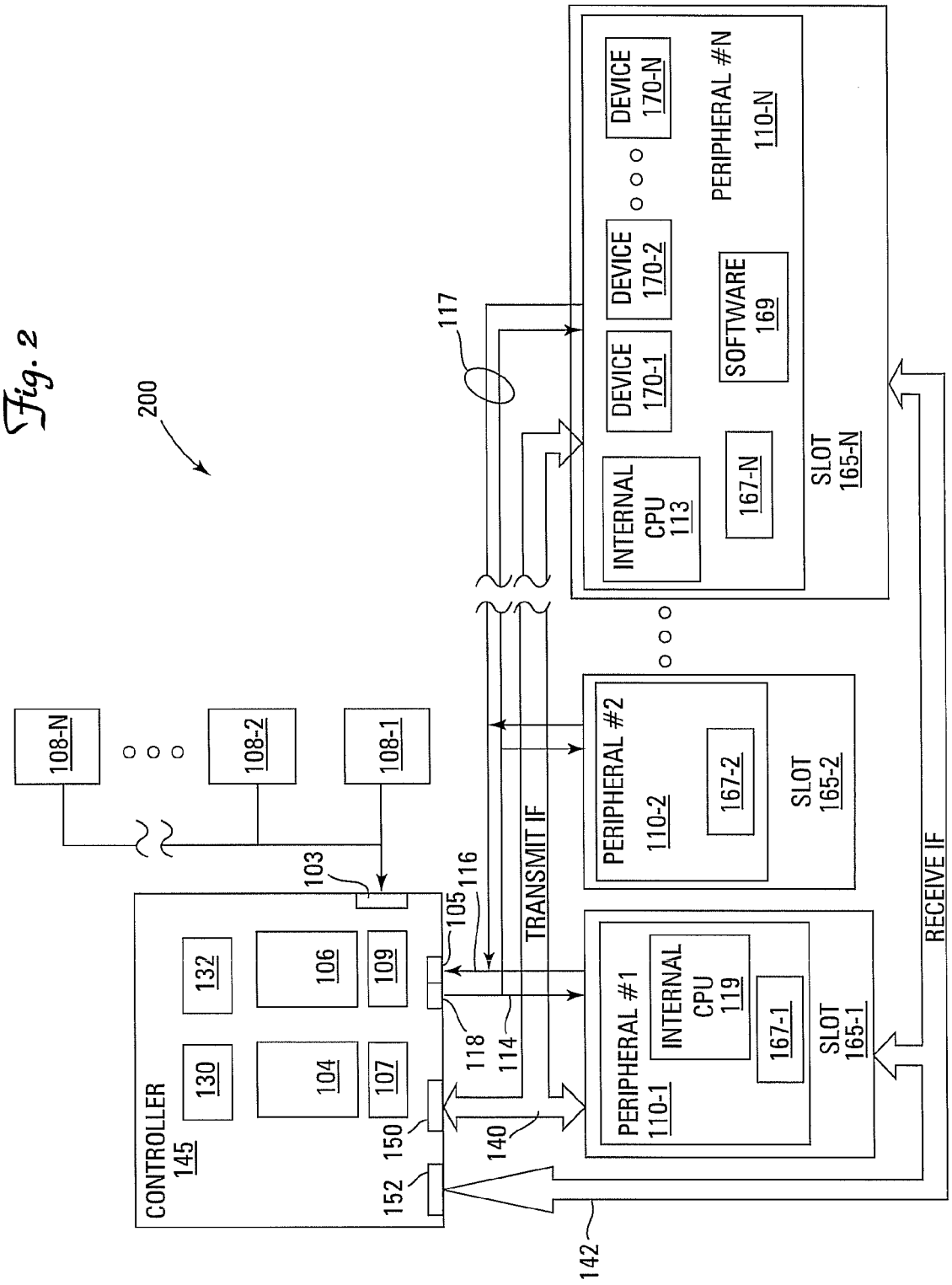
FIG. 2 is a block diagram of a multi-function system having a system of circumvention and recovery of one embodiment of the present invention.

Referring to FIG. 2, a multi-function system 200 of one embodiment of the present invention is illustrated. The multi-function system 200 is similar in function to multi-function system 100 described above with reference to FIG. 1. The multi-function system 200 differs in structure from the multi-function system 100 in that the transmit clock 130 and the receive cloak 132 replace the single dedicated clock 120 and the communication interfaces 140 and 142 replace communication interface 112. In another implementation of multi-function system 200, the controller 145 includes the single dedicated clock 120. In yet another implementation of multi-function system 200, the communication interface 112 is used in place of the communication interfaces 140 and 142.

The dedicated control interface 117 communicatively couples the controller 145 to the plurality of peripherals 110 (1-N) as described above with reference to FIG. 1. As illustrated in FIG. 2, the controller 145 is in communication with the event detectors 108 (1-N). The function and structure of the plurality of event detectors 108 (1-N) was described above with reference to FIG. 1.

The communication interface 140 referred to herein as "transmit interface 140" sends communications from the controller 145 to each of the peripherals that include central processing units. The transmit interface 140 uses the transmit clock 130 to schedule communications. The communication interface 142 referred to herein as "receive interface 142" sends communications to the controller 145 from each peripheral that includes an internal central processing unit.

The receive interface 142 uses the receive clock 132 to schedule communications. Transmit interface 140 and receive interface 142 together function as the communication channel 112 of FIG. 1 to allow for the communication with and control of the respective CPU 119 and 113 by the controller 145. If a CPU 119 and/or 113 is to be shut down as the result of a detected event, vital data is stored in memory 109 of controller 145 during the shut down. When the event is over, the stored vital data is retrieved and sent back to the respective CPU 119 and 113.

In one implementation of this embodiment, the transmit interface 140 and receive interface 142 are each a single bi-directional data line that is implemented in a shared-half-duplex-serial interface. The shared-half-duplex-serial interface is configured for one of a plurality of possible formats and can be implemented in single-ended or differential technologies as described above with reference to FIG. 1.

In one implementation of this embodiment, the transmit interface 140 and receive interface 142 are each a single bi-directional data line that is implemented in a dedicated-half-duplex-serial interface. The dedicated-half-duplex-serial interface is configured for one of a plurality of possible formats and can be implemented in single-ended or differential technologies as described above with reference to FIG. 1.

Figure 3:
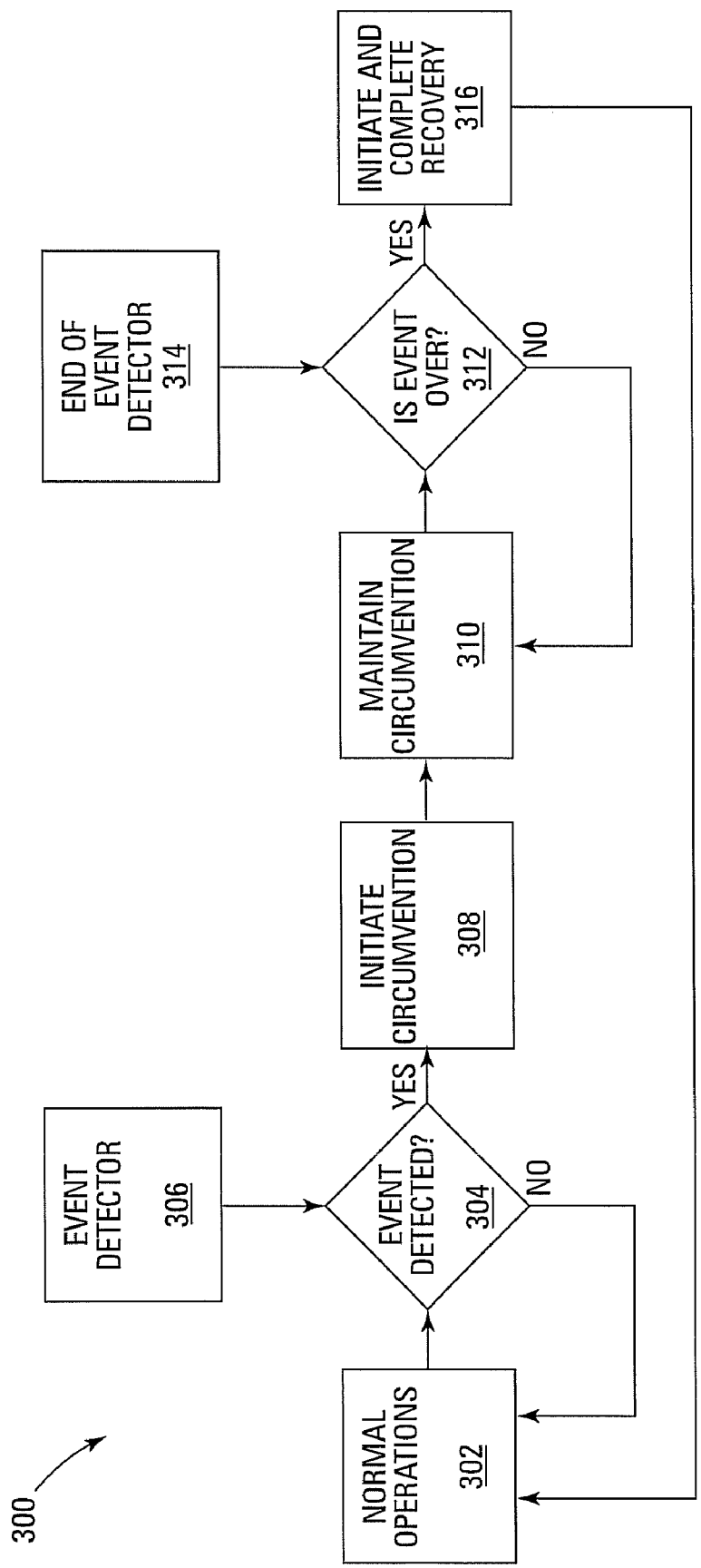
FIG. 3 is a circumvention flow diagram of one embodiment of the present invention.

FIG. 3 illustrates a circumvention flow diagram 300 of one embodiment of the present invention. As illustrated, the diagram 300 starts in normal operations at step (302). An event detector 206 is used to detect events. As discussed above, the event detector 206 can be any type of detector configured to detect an event that could hamper the function of the system. If no event is detected by the event detector 206 at step 304, normal operations are continued at step (302). If, however, an event is detected at step 304, an initiate circumvention step (308) occurs. During this step (308), as discussed above, the controller directs each peripheral in the system to take circumvention steps according to the level of threat posed by the event and the ability of the peripheral to withstand the event. The circumvention is maintained at step (310). An end of event detector 314 is used to determine if the event is over. As discussed above, the end of event detector may be the same or another event detector that is polled, a timer or any other device known in the art to detect the end of an event. If it is determined that the event is not over at step (311), the circumvention is maintained. If it is determined that the event is over at step (312), recovery to normal operations is initiated and completed at step (316).

Figure 4:
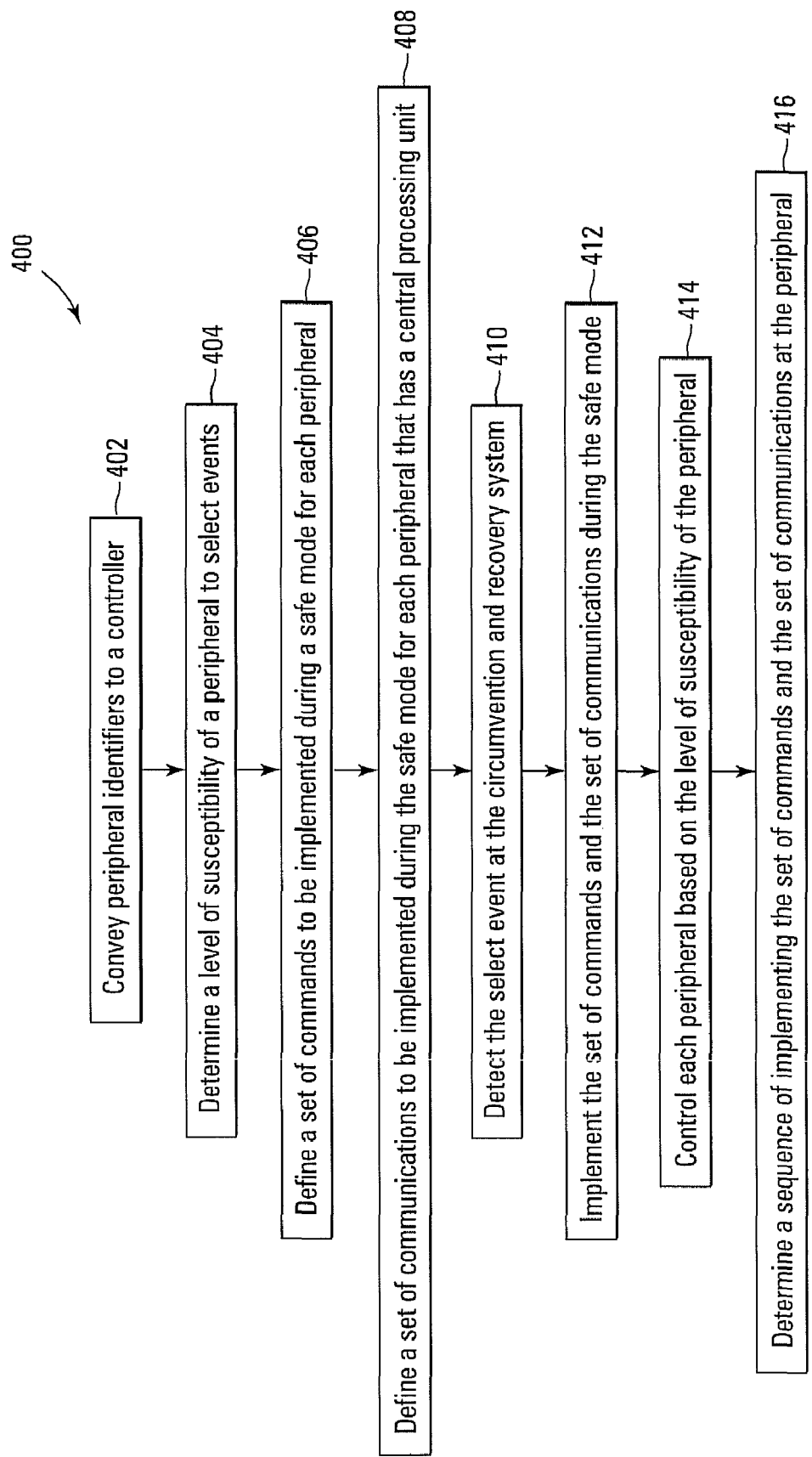
FIG. 4 is a flow diagram of one embodiment of a method to implement circumvention and recovery in a multi-function system in accordance with the present invention.
Figure 6:
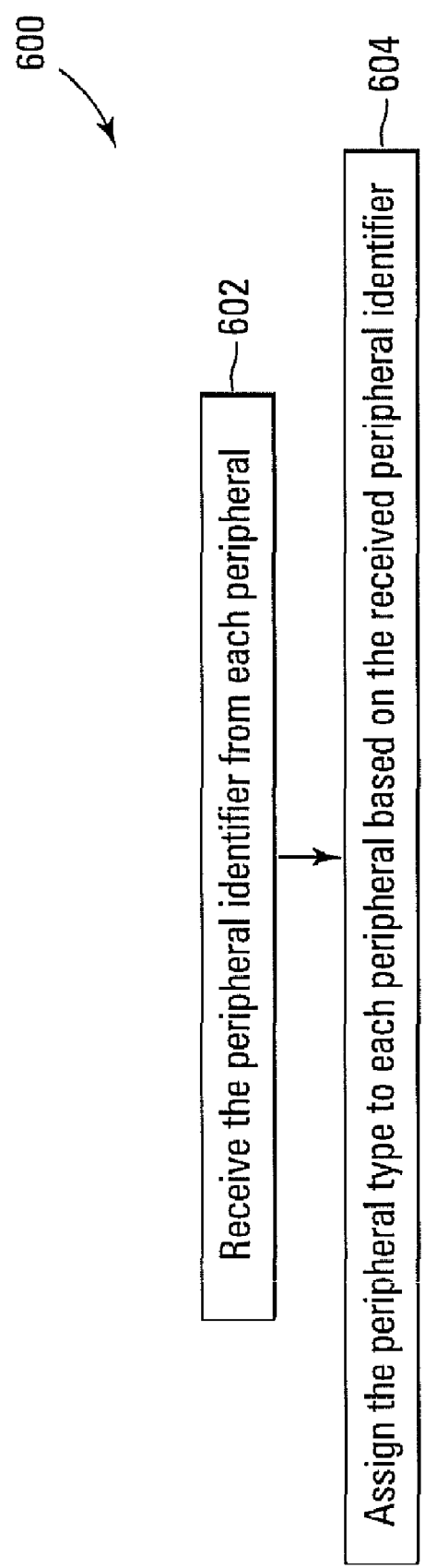
FIG. 6 is a flow diagram of one embodiment of a method to convey peripheral identifiers to a controller in a multi-function system in accordance with the present invention.

FIG. 4 is a flow diagram of one embodiment of a method 400 to implement circumvention and recovery in a multi-function system 100 in accordance with the present invention. The method 400 is described with reference to multi-function system 100 of FIG. 1. As illustrated, the diagram 400 starts by conveying peripheral identifiers to a controller 102 (402). Method 600 of FIG. 6 provides details about conveying the peripheral identifiers. Based on the peripheral identifier, a level of susceptibility of a peripheral 110 to select events is determined (404).

A set of commands to be implemented during a safe mode is defined for each peripheral 110 (406). The set of commands is based on the peripheral identifier and the level of susceptibility of the peripheral 110. A set of communications to be implemented during the safe mode is defined for each peripheral that has a central processing unit (408). The set of communications is based on the peripheral identifier and the level of susceptibility of the peripheral 110. In one implementation of this embodiment, the set of communications to be implemented during the safe mode is defined for peripheral 110-1 and 110-N that have respective central processing units 119 and 113. The sets of commands and communications can include commands and communications to verify the health of a processor-instruction-sequencing within the peripheral, commands and communications to verify the health of a processor-instruction-processing within the peripheral 110, commands and communications to verify the health of memory operation of the peripheral 110, commands and communications to verify the health of retention integrity of the peripheral 110, and combinations thereof.

The select event is detected at the multi-function system 100 by the event detectors 108 (1-N) (410). The set of commands and the set of communications are implemented during the safe mode responsive to detection of the select event (412). At least one part of implementing the set of commands and the set of communications during the safe mode includes verifying health of a processor-instruction-sequencing within the peripheral, verifying health of a processor-instruction-processing within the peripheral, verifying health of memory operation of the peripheral, and/or verifying health of retention integrity of the peripheral.

While the detection of a select event is being detected, the environmentally hardened processor 106 in the controller 102 controls each peripheral 110 based on the level of susceptibility of the peripheral 110 and based on the communications about the health of the peripheral 110 received from the set of communications and set of commands (414). For example, if a device 170-2 in the peripheral 110-N is a memory with an unknown level of susceptibility to the event and if the health of memory operation of the peripheral 110-N is positively verified during step 412, then the environmentally hardened processor 106 keeps the healthy memory (device 170-2) in operation by sending a command "KEEP DEVICE 170-2 IN OPERATION" during the select event.

While the detection of a select event is being detected, the sequence in which the set of commands and the set of communications are implemented is determined by the peripheral 110 (416). The sequence is determined based on the functionality of the peripheral 110 and the resource utilization of the peripheral 110 as determined by the verified health.

For example, referring again to peripheral 110-N, if the device 170-1 is an event-intolerant power supply that supplies power to the device 170-2, and the device 170-N is a event-hardened power supply, then during the event, the peripheral 110-N configures itself so that the event-hardened power supply (170-N) is supplying power to device 170-2 prior to shutting down the event-intolerant power supply device (170-1). In this manner, the internal central processing unit 113 in the peripheral 110-N responds to commands "SHUT DOWN DEVICE 170-1 " and "PROVIDE POWER TO DEVICE 170-2 FROM DEVICE 170-N" in the order required to keep power supplied to device 170-2, throughout the select event.

Figure 5:
FIG. 5 is a flow diagram of one embodiment of a method to implement circumvention and recovery in a multi-function system in accordance with the present invention.

FIG. 5 is a flow diagram of one embodiment of a method 500 to implement circumvention and recovery in multi-function system 100 in accordance with the present invention. Method 500 differs from method 400 in that there are separate sets of command and communications that are implemented during and after the safe mode. The method 500 is described with reference to multi-function system 100 of FIG. 1. As illustrated, the diagram 500 starts by defining a first set of commands to be implemented during a safe mode for each peripheral 110 based on the peripheral identifier (502). A first set of communications to be implemented during the safe mode are defined for each peripheral 110-1 that includes a central processing unit 119 based on the peripheral identifier (504). A second set of commands to be implemented after the safe mode for each peripheral 110 are defined based on the peripheral identifier (506). A second set of communications to be implemented after the safe mode are defined for each peripheral 110-1 that includes a central processing unit 119 based on the peripheral identifier (508). A select event is detected at the multi-function system 100 (510). When the select event is detected, the first set of commands and the first set of communications are implemented during the safe mode responsive to detection of the select event (512). At least one part of implementing the first set of commands and the first set of communications during the safe mode includes verifying health of a processor-instruction-sequencing within the peripheral, verifying health of a processor-instruction-processing within the peripheral, verifying health of memory operation of the peripheral, and/or verifying health of retention integrity of the peripheral as described above with reference to method 400 of FIG. 4. The safe mode continues as long as the select event is detected and the event or events are determined to be a threat. The safe mode ends once the event or events are over or determined to no longer be a threat.

When the event is over or determined to no longer be a threat, the second set of commands and the second set of communications are implemented responsive to detection of an end of the select event (514). Implementing the second set of commands and the second set of communications after the safe mode comprises one of restoring a memory in the peripheral, resetting a peripheral, restarting a peripheral; restoring a memory in a device in the peripheral, resetting a device in the peripheral, restarting a device in the peripheral and combinations thereof.

A sequence of implementing the first set of commands, the first set of communications, the second set of commands, and the second set of communications at the peripheral is implemented based on the functionality of the peripheral and the resource utilization of the peripheral as determined by the verified health (516).

FIG. 6 is a flow diagram of one embodiment of a method 600 to convey peripheral identifiers to a controller in a multi-function system in accordance with the present invention. The method 600 is described with reference to multi-function system 100 of FIG. 1. As illustrated, the diagram 600 starts by receiving the peripheral identifier from each peripheral (602). In one implementation of this embodiment, the peripheral identifier is a fixed address. In this case, the fixed address is assigned to each peripheral based on the physical slot into which the peripheral is inserted, a device installed on a peripheral, and software in the peripheral. For example, the fixed address peripheral identifier for peripheral 110-1 is assigned based on a physical slot 165-1 into which the peripheral 110-1 is inserted, the fixed address peripheral identifier for peripheral 110-2 is assigned based on device 167-2 installed on the peripheral 110-2, and the fixed address peripheral identifier for peripheral 110-N is assigned based on device 167-N installed in peripheral 110-N and/or, alternatively, based on software module 169 in the peripheral 110-N.

In another implementation of this embodiment, the peripheral identifier is an index. In this case, the index is assigned to each peripheral based on the physical slot 167 into which the peripheral 110 is inserted, a configured device 167(1-N) or software in the peripheral. For example, the index peripheral identifier for peripheral 110-1 is assigned based on a physical slot 165 into which the peripheral 110-1 is inserted, the index peripheral identifier for peripheral 110-2 is assigned based on device 167-2 installed in peripheral 110-2, and the index peripheral identifier for peripheral 110-N is assigned based on device 167-N installed in peripheral 110-N or, alternatively, based on software module 169 in the peripheral 110-N.

The peripheral type is assigned to each peripheral based on the received peripheral identifier (604). The controller 102 uses a look-up table, similar to Table 1, to determine the peripheral type. From the peripheral type the controller 102 determines the level of susceptibility and thereby the sets of commands and communications for each peripheral 110.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A method of implementing a circumvention and recovery system, the method comprising:
   conveying peripheral identifiers to a controller;
   based on the peripheral identifier, determining a level of susceptibility of a peripheral to select events;
   defining a first set of commands to be implemented during a safe mode for each peripheral based on the peripheral identifier;
   defining a first set of communications to be implemented during the safe mode for each peripheral including a central processing unit based on the peripheral identifier;
   defining a second set of commands to be implemented after the safe mode for each peripheral based on the peripheral identifier;
   defining a second set of communications to be implemented after the safe mode for each peripheral including a central processing unit based on the peripheral identifier; and
   during detection of a select event, controlling each peripheral based on the level of susceptibility of the peripheral.

2. The method of claim 1, wherein conveying peripheral identifiers to the controller comprises:
   receiving the peripheral identifier from each peripheral; and
   assigning the peripheral type to each peripheral based on the received peripheral identifier.

3. The method of claim 2, wherein the peripheral identifier is a fixed address, and wherein the fixed address is assigned to each peripheral based on one of a physical slot into which the peripheral is inserted, a device installed on a peripheral, and software in the peripheral.

4. The method of claim 2, wherein the peripheral identifier is an index, and wherein the index is assigned to each peripheral based on one of a physical slot into which the peripheral is inserted, a device installed on a peripheral, and software in the peripheral.

5. The method of claim 1, further comprising:
   detecting the select event at the circumvention and recovery system; and
   implementing the first set of commands and the first set of communications during the safe mode responsive to detection of the select event.

6. The method of claim 5, wherein implementing the first set of commands and the first set of communications during the safe mode comprises one of verifying health of a processor-instruction-sequencing within the peripheral, verifying health of a processor-instruction-processing within the peripheral, verifying health of memory operation of the peripheral, verifying health of retention integrity of the peripheral, and combinations thereof.

7. The method of claim 6, the method further comprising:
determining a sequence of implementing the first set of commands and the first set of communications at the peripheral based on the functionality of the peripheral and the resource utilization of the peripheral as determined by the verified health.

8. The method of claim 1, further comprising:
detecting the select event at the circumvention and recovery system;
implementing the first set of commands and the first set of communications during the safe mode responsive to detection of the select event; and
implementing the second set of commands and the second set of communications after the safe mode responsive to detection of an end of the select event.

9. The method of claim 8, wherein implementing the first set of commands and the first set of communications during the safe mode comprises one of verifying health of a processor-instruction-sequencing within the peripheral, verifying health of a processor-instruction-processing within the peripheral, verifying health of memory operation of the peripheral, verifying health of retention integrity of the peripheral, and combinations thereof; and
wherein implementing the second set of commands and the second set of communications after the safe mode comprises one of restoring a memory in the peripheral, resetting a peripheral, restarting a peripheral; restoring a memory in a device in the peripheral, resetting a device in the peripheral, restarting a device in the peripheral and combinations thereof.

10. The method of claim 9, the method further comprising:
determining a sequence of implementing the first set of commands, the first set of communications, the second set of commands, and the second set of communications at the peripheral based on the functionality of the peripheral and the resource utilization of the peripheral as determined by the verified health.

11. A multi-function system, the system comprising:
a plurality of peripherals having different levels of susceptibility to select events, wherein at least one peripheral comprises a central processing unit;
at least one event detector configured to detect the select events; and
a controller coupled to receive an event-detected signal from the at least one event detector, the controller configured to:
define a set of commands to be implemented during and after a safe mode for each peripheral based on a peripheral identifier,
define a set of communications to be implemented during and after the safe mode for each peripheral based on the peripheral identifier, and
implement control circumvention procedures of each peripheral based on the detected select event and the level of susceptibility of the peripheral, wherein implementing control circumvention procedures comprises implementing the defined set of commands and the defined set of communications.

12. The system of claim 11, wherein the plurality of peripherals having different levels of susceptibility to select events comprise at least one of radiation hardened components; radiation tolerant components; components having undetermined tolerance to radiation; components having known tolerance to radiation; one or more radiation hardened memories; one or more radiation tolerant memories; one or more memories having undetermined tolerance to radiation; one or more memories having known tolerance to radiation; one or more radiation hardened power supplies; one or more radiation tolerant power supplies; one or more power supplies having undetermined tolerance to radiation; one or more power supplies having known tolerance to radiation; commercial components; commercial central-processing-units; select-event-hardened components; select-event-tolerant components; components having undetermined tolerance to select events; components having known tolerance to select events; one or more select-event-hardened memories; one or more select-event-tolerant memories; one or more memories having undetermined tolerance to select events; one or more memories having known tolerance to select events; one or more select-event-hardened power supplies; one or more select-event-tolerant power supplies; one or more power supplies having undetermined tolerance to select events; one or more power supplies having known tolerance to select events; commercial components; and commercial central-processing-units.

13. The system of claim 11, further comprising:
an end-of-event detector in communication with the controller, the controller configured to restore normal operations of the plurality of peripherals based on an end-of-event signal from the end-of-event detector.

* * * * *